G. DESSON.
PNEUMATIC TIRE FOR VEHICLE WHEELS.
APPLICATION FILED JUNE 21, 1911.

1,025,610.

Patented May 7, 1912.

UNITED STATES PATENT OFFICE.

GEORGES DESSON, OF PARIS, FRANCE.

PNEUMATIC TIRE FOR VEHICLE-WHEELS.

1,025,610.

Specification of Letters Patent.

Patented May 7, 1912.

Application filed June 21, 1911. Serial No. 634,631.

*To all whom it may concern:*

Be it known that I, GEORGES DESSON, a citizen of the French Republic, residing at Paris, France, have invented certain new and useful Improvements in Pneumatic Tires for Vehicle-Wheels, of which the following is a specification.

This invention relates to improvements in elastic wheel tires which are constructed so that they combine the advantages of pneumatic tires with those of the solid india-rubber tires.

In the accompanying drawings the improved tire is shown.

Figure 2:
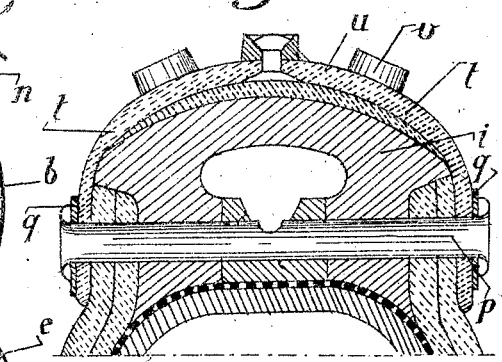
Figure 1:
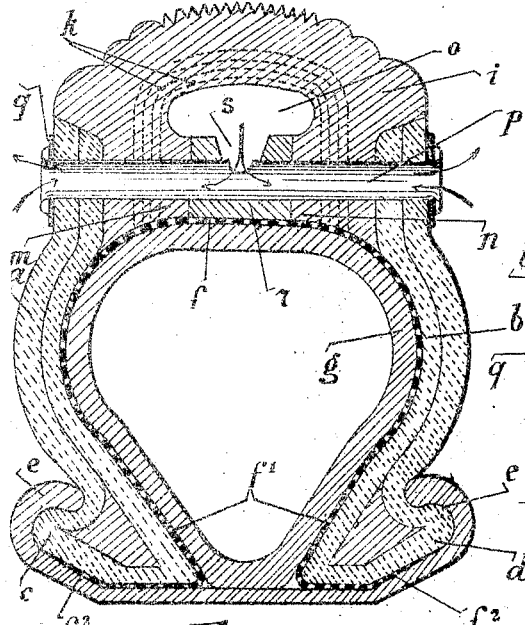
Figure 3:
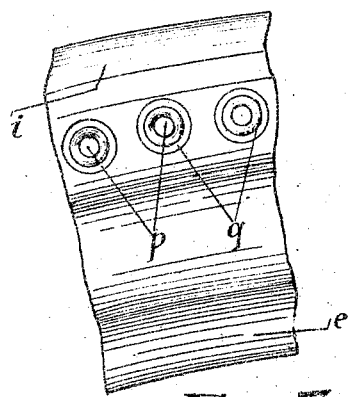
Figure 4:
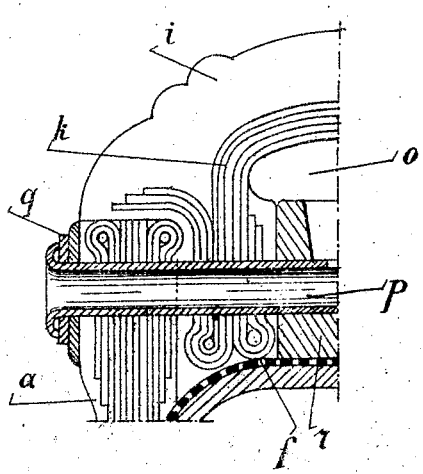

Figure 1 represents the improved tire in a cross section. Fig. 2 is a partial lateral elevation of Fig. 1.

The improved tire essentially consists of two inextensible lateral parts $a$ and $b$ made of leather or of canvas strongly impregnated with caoutchouc and of strips of india-rubber. The strips of these different materials are juxtaposed and vulcanized together. At the inner edges of the lateral parts the usual shoulders $c$ and $d$ are arranged designed to engage with the curved edges $e$ of the wheel rim. As the lateral parts of the tire are almost flat they are easy to manufacture and the number of layers is not limited as is the case with the ordinary pneumatic tires for motor-cars owing to the curvature of the envelop.

Between the outer free edges of the lateral parts $a$ and $b$ of the tire a thick rubber tire $i$ is arranged which forms the tread proper. This rubber tread $i$ is reinforced by the insertion of a certain number of strips $k$ of canvas and it has at its inner ends two shoulders $m$—$n$ between which a ring $r$ of india-rubber is inclosed. This block or filler $r$ fills in the space between the lower parts of the inner surfaces of the tread $i$ so that an annular chamber $o$ is formed in said tread $i$.

The lateral parts $a$—$b$ are connected with each other and with the tread $i$ by means of tubular cross bolts $p$ of steel or of any other suitable material, which are arranged parallel with the axis of the hub. The outer ends of said tubular bolts $p$ are bent outward, washers $q$ of suitable material being placed between the flanges of the tubular bolts and the outer surfaces of the lateral parts $a$—$b$. There are used as many tubular bolts as necessary. The ring shaped filler $r$ has a circular groove $s$ in its outer surface which registers with a hole in each of the tubular bolts $p$ so that the annular chamber $o$ communicates with the outer air through said tubular bolts as indicated by the arrows in Fig. 1. The casing for the pneumatic tube $g$ is formed by the said lateral parts $a$—$b$ and the tread proper $i$. The pneumatic tube is inflated in the well known manner by means of an air valve.

The improved wheel tire as hereinbefore described is cheap to manufacture and it combines the advantages of a solid rubber tire (the tread $i$) with those of the pneumatic tires ($g$) without however presenting any of the inconveniences inhering to the tires of the two types used separately, owing to the combination of the two types of tires. The tread $i$ has the elasticity of pneumatic tires but it avoids the danger of puncture which forms the great inconvenience of such air tires. Further, owing to the active ventilation which is effected through the tubular bolts $p$, the rubber of the tread is prevented from getting hot. The tire is easy to put on or to take off and the tread $i$, if worn, can be easily replaced.

Fig. 2 shows the improved tire with a non-skidding tread. The band $t$ of leather or of other convenient material forming the non-skidding tread is placed upon the rubber tread $i$ with which it is connected by vulcanizing. The edges of the non-skidding tread $t$ are fixed by the washers $q$ and by the flanges of the tubular bolts $p$. A strip $n$ of convenient material is placed between the non-skidding tread $t$ and the rubber tread $i$. The metal rivets $v$ can be fixed in the non-skidding tread $t$ in any convenient manner. The lateral parts $a$—$b$ of the casing of the tire could further be cut out of an ordinary mantle of a pneumatic tire.

I claim:

An improved tire for vehicle wheels comprising in combination a solid rubber tread and an air chamber, a casing for said air chamber formed of two lateral rings, a tread of thick india-rubber fixed between the outer edges of said lateral rings, said tread having an annular chamber, tubular cross bolts connecting the lateral parts of the casing with each other and with the tread having each a hole communicating with the said annular chamber, substantially as described and shown and for the purpose set forth.

In witness whereof I have hereunto set my hand in the presence of two witnesses.

GEORGES DESSON.

Witnesses:
H. C. COXE,
ALBERT DE CAYALADE.